(12) United States Patent
Schluessler et al.

(10) Patent No.: US 9,274,839 B2
(45) Date of Patent: Mar. 1, 2016

(54) TECHNIQUES FOR DYNAMIC PHYSICAL MEMORY PARTITIONING

(71) Applicant: Intel Corporation, Santa Clara, CA (US)

(72) Inventors: Travis T. Schluessler, Hillsboro, OR (US); Robert B. Taylor, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 64 days.

(21) Appl. No.: 13/628,314

(22) Filed: Sep. 27, 2012

(65) Prior Publication Data

US 2014/0089626 A1 Mar. 27, 2014

(51) Int. Cl.
G06F 9/455 (2006.01)
G06F 9/50 (2006.01)
G06F 12/02 (2006.01)

(52) U.S. Cl.
CPC .......... *G06F 9/5016* (2013.01); *G06F 9/45558* (2013.01); *G06F 12/0284* (2013.01); *G06F 2212/1041* (2013.01)

(58) Field of Classification Search
CPC . G06F 9/5016; G06F 9/45558; G06F 12/023; G06F 12/0284; G06F 12/08; G06F 2009/4557; G06F 2212/1044; G06F 2212/1041
USPC .................................. 711/170; 718/104, 105
See application file for complete search history.

(56) References Cited

U.S. PATENT DOCUMENTS

| | | | |
|---|---|---|---|
| 8,374,242 B1 | 2/2013 | Lewis et al. | |
| 8,463,980 B2 | 6/2013 | Post et al. | |
| 8,463,981 B2 | 6/2013 | Mori et al. | |
| 2009/0070776 A1* | 3/2009 | Dahlstedt | 719/312 |
| 2009/0204718 A1 | 8/2009 | Lawton et al. | |
| 2010/0161908 A1 | 6/2010 | Nation et al. | |
| 2011/0138147 A1* | 6/2011 | Knowles et al. | 711/170 |
| 2012/0131259 A1 | 5/2012 | Baskakov et al. | |
| 2012/0137045 A1 | 5/2012 | Bacher et al. | |
| 2012/0159098 A1 | 6/2012 | Cheung et al. | |
| 2012/0173822 A1 | 7/2012 | Testardi et al. | |
| 2012/0254497 A1 | 10/2012 | Ni et al. | |

OTHER PUBLICATIONS

"Intel 910GML/915G/915GM/915GMS/915GV and 910GL Express Chipsets Intel Dynamic Video Memory Technology (DVMT) 3.0" (White Paper) Aug. 2005, 24pgs.
Pan et al., "Hypervisor Support for Efficient memory De-duplication", Parallel and Distributed Systems (ICPADS), 2011 IEEE 14th, Dec. 7-9, 2011, ISBN 978-1-4577-1875-5.
Office Action received for U.S. Appl. No. 13/330,398, mailed Apr. 23, 2015, 18 pages.

* cited by examiner

*Primary Examiner* — Gary W Cygiel
(74) *Attorney, Agent, or Firm* — Kacvinsky Daisak Bluni PLLC

(57) ABSTRACT

Various embodiments are presented herein that reallocate partitions of a shared physical memory between processing units. An apparatus and a computer-implemented method may determine an amount of memory space in the physical memory allocated to a first processing unit during system initialization. The determined amount of the memory space may be consolidated. The consolidated memory space may be allocated to the second processing unit during runtime. Other embodiments are described and claimed.

29 Claims, 8 Drawing Sheets

TECHNIQUES FOR DYNAMIC PHYSICAL MEMORY PARTITIONING

BACKGROUND

Computing systems often use shared memory between the central processing unit and the graphical processing unit. Currently, the physical memory of the computing system is assigned at the time the computing system initialization. For example, one portion of memory is statically assigned for use by the central processing unit while another portion is statically assigned for use by the graphical processing unit. Because the memory is statically assigned at system initialization, e.g., system boot-up, if it is later determined during runtime that either the central processing unit or the graphical processing unit needs additional physical memory, it is not possible using currently available solutions to fulfill that need because the static allocation of physical memory cannot be changed during runtime.

Current solutions to accommodate an application's need for more memory are often inefficient, reduce system performance and/or reduce the number of simultaneously running applications. Accordingly, there may be a need for improved techniques to solve these and other problems.

DETAILED DESCRIPTION

Figure 1:
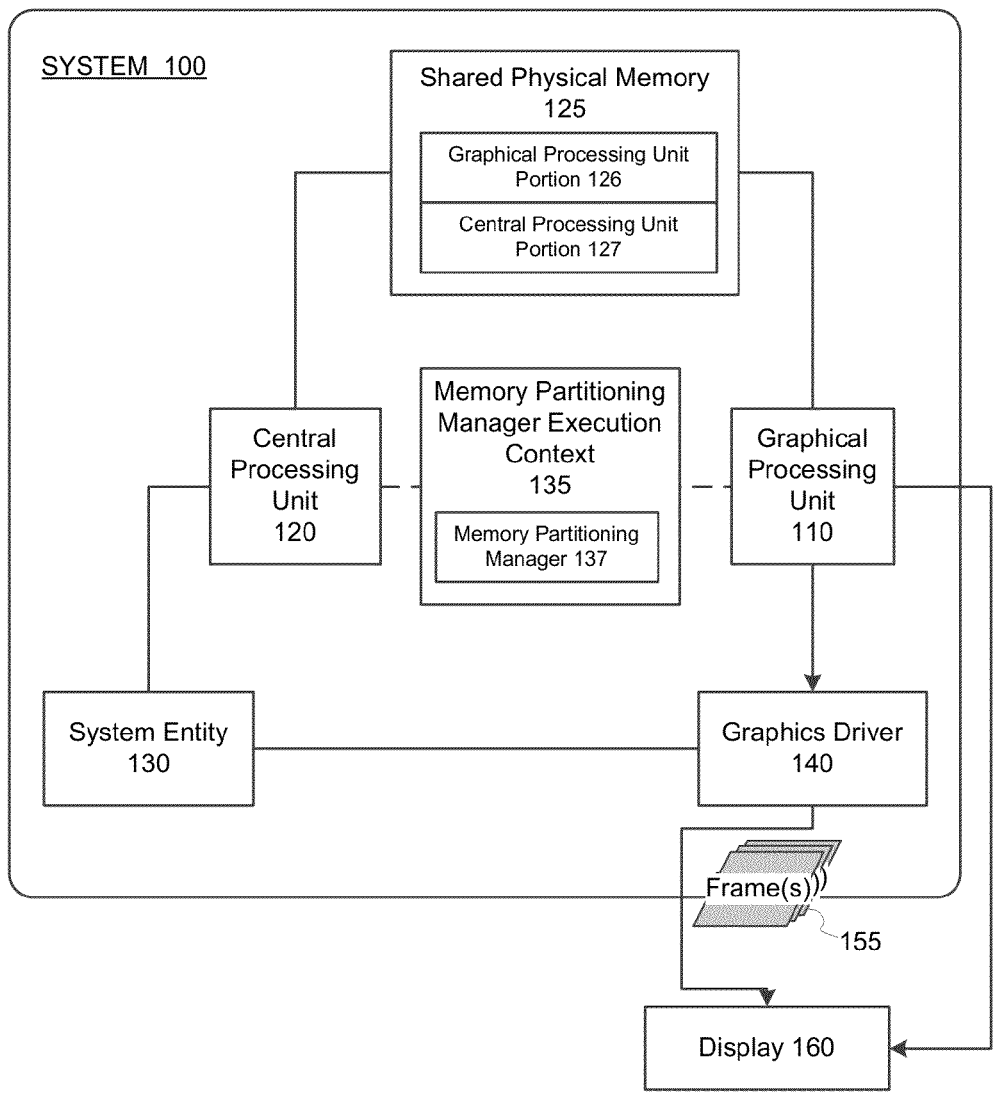
FIG. 1 illustrates a block diagram of a first system.

Embodiments are generally directed to memory allocation techniques during runtime. Currently, static memory space may only be allocated during system initialization. System initialization may comprise the time period when a computing system loads an operating system onto memory and the basic input-output system on the computing system is reactivated. System initialization may occur as soon as the computing system is turned on and may be referred to as system boot-up or system startup. Once the operating system is loaded, system initialization is complete and runtime begins. Runtime may comprise the time period after system initiation occurs and continues until the system is closed and/or turned off.

Some embodiments are particularly directed to memory allocation techniques arranged to dynamically allocate static memory space from a first processing unit to a second processing unit during runtime. In one embodiment, for example, a memory partitioning manager may determine that a second processing unit needs more memory. Instead of waiting until the system reinitializes, the memory partitioning manager may determine an amount of memory space in the physical memory currently allocated to a first processing unit to reallocate to a second processing unit during runtime. The memory partitioning manager may consolidate the memory space during runtime in order to allocate the second processing unit with more memory. As current memory allocation often results in a first processing unit having available or unused allocated static memory space while a second processing unit needs more memory space to run an application, the embodiments described herein can reallocate the static memory space from the first processing unit to the second processing unit during runtime. By reallocating static memory space to the processing units during runtime, the distribution of physical memory may lead to more efficient memory allocation while reducing or removing latencies associated with re-initializing a system platform.

A computing platform may include a physical memory. The physical memory may be shared by one or more processing units. The shared physical memory may be divided into various memory spaces which are allocated to a processing unit. The terms memory and memory space may be used interchangeably throughout this disclosure. For example, if a computing system includes a graphical processing unit and a central processing unit, the physical memory region may be divided into a first memory space allocated to the graphical processing unit and a second memory space allocated to the central processing unit.

The computing platform may include multiple processing units such as a central processing unit, a graphical processing unit, a digital signal processing unit and/or a network processing unit. A processing unit may include a processor circuit. A central processing unit and a network processing unit execute instructions by performing basic arithmetical and logical operations. A graphical processing unit manipulates and alters memory to accelerate creation of images which can be output to a display. A digital signal processing unit manipulates, by filtering and compressing, analog information signals.

A processing unit may run one or more system entities, such as an application or an operating system. When a system entity is run on a processing unit, the system entity may use memory space in the physical memory allocated to that processing unit. Currently, when a processing unit uses all of the allocated static memory space, the processing unit cannot be allocated more memory space as the shared physical memory cannot be repartitioned during runtime.

Historically, each processing unit was a discrete physical unit located on a separate silicon die. The discrete processing unit included its own memory which was often attached directly to the processing unit. As a result, the processing units did not have electrical access to one another's memory. As such, there was no way for the processing units to share memory resources.

Currently, the processing units are often integrated onto the same silicon die. As the processing units are in the same physical space, the processing units have electrical access to same physical memory and that physical memory is shared. However, even though the processing units have access to the shared physical memory, the system entities, such as, but not limited to, the basic input-output system, the operating system, three-dimensional run time applications and application interfaces, are still using the memory allocated to the processing unit as if the shared physical memory is a separate physical memory. As such, at system initiation, the basic input-output system defines a certain amount of memory for each processing unit and currently there is no way to dynamically reallocate the shared physical memory allocation during runtime. So instead of reallocating the memory, the processing unit uses virtual memory or closes system entities that use the processing unit's allocated memory space in order for the current system entity to continue running.

The current method of using virtual memory causes reduced performance of the computing system. Other methods, such as paging a processing unit also reduce performance of the system. Additionally, methods such as reducing the number of simultaneous applications that can run on the processing unit are inefficient as memory space allocated to a different processing unit may be available.

To solve these and other problems, embodiments dynamically reallocate static memory space within the shared physical memory from a first processing unit to a second processing unit during runtime. A memory partitioning manager may be included in the computing system to determine an amount of memory space in a physical memory allocated to a first processing unit to reallocate to the second processing unit. The memory partitioning manager may communicate with the processing units to ensure that any system entities currently running on the first processing unit are completed prior to reallocating the determined amount of memory space to the second processing unit. Without the use of a memory partitioning manager ensuring that system entities are not currently running on the memory space allocated to the first processing unit, the reallocation of static memory space may cause system failure.

Once the first processing unit communicates with the memory partitioning manager that no system entities are currently running, the memory partitioning manager may consolidate the determined amount of static memory space during runtime. The consolidated memory space may be allocated to the second processing unit. By dynamically responding during runtime to the second processing unit's need for more memory, the system may efficiently use the memory space within the shared physical memory.

Accordingly, various embodiments describe repartitioning and reallocating memory space in a shared physical memory during runtime. By using a memory partitioning manager to repartition memory space, the allocation of the shared physical memory to processing units may be efficient. For example, as the current allocation of memory space is static, a first processing unit may have available allocated memory space while a second processing unit may need more memory space to run an application. In the embodiments described herein, memory space in the shared physical memory may be reallocated from a first processing unit to a second processing unit during runtime which most efficiently preserves power and performance.

An apparatus may include a processor circuit and a memory partitioning manager operative on the processor circuit. The memory partitioning manager may repartition a physical memory with a first memory space allocated to a first processing unit and a second memory space allocated to a second processing unit. The memory partitioning manager may determine the amount of first memory space to allocate to the second processing unit and may consolidate the first memory space during runtime. The memory partitioning manager may allocate contiguous consolidated memory space to the second processing unit.

The memory partitioning manager may be a component of a memory partitioning manager execution context. In an embodiment, the memory partitioning manager execution context may be a virtual machine monitor. A virtual machine monitor may comprise a virtual machine, or host operating system, which allows a computing device to support a plurality of identical execution environments. In an alternate embodiment, the memory partitioning manager execution context may run on the central processing unit as a software component, run on an operating system or run as a hardware unit. The memory partitioning manager may repartition the physical memory so that more memory space may be allocated to a processing unit. For example, the memory partitioning manager may initiate actions to change memory allocations based on detected needs of the system. Alternatively or in addition, the memory partitioning manager may respond to requests from system entities, such as applications or operating systems, to alter the shared physical memory allocation.

The embodiments described herein may provide several advantages over conventional memory allocation techniques. By reallocating memory space from a first processing unit to a second processing unit, the shared physical memory is used more efficiently. A more efficient use of memory space may increase the speed of an individual application and/or a collective group of applications. Additionally, a more efficient use of memory space may allow more applications to run simultaneously. For example, the number of applications simultaneously running on a processing unit and using memory space may not need to be reduced in order for another application to run on the processing unit and use the memory space. Instead, available memory space allocated to a different processing unit may be reallocated during runtime. By reallocating memory to a processing unit during runtime, instead of waiting until the system reinitializes, current methods which cause a reduction in system performance may be unnecessary. Some current methods which reduce system performance, such as, using virtual memory or paging graphical processing unit memory resources, may be avoidable. Further, by reallocating memory space during runtime, power may be conserved as unneeded memory may be powered down during runtime instead of waiting until the system reinitializes. Reduced power consumption may be especially advantageous when the system is operating on battery power because it can extend the life of the battery.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 implementing an exemplary computing platform. The system 100 may include multiple processor circuits. The plurality of processor circuits may include at least a first processing unit and a second processing unit. The plurality of processor circuits may be denoted as a central processing unit 110 and a graphical processing unit 120. The system 100 may include a shared physical memory 125 and a memory partitioning manager execution context 135.

A graphical processing unit 110 may manipulate and alter memory to accelerate the creation of images available for output to a display. A graphical processing unit 110 efficiently manipulates computer graphics by performing computationally intensive calculations at a rapid speed. A graphical processing unit 110 quickly processes large blocks of data in parallel. A central processing unit 120 may execute instructions by performing basic arithmetical and logical operations. Although not shown in FIG. 1, the system 100 may additionally or alternatively include processing units such as, but not limited to, a digital signal processing unit and/or a network processing unit.

The shared physical memory 125 may include memory space allocated to a processing unit. For example, in FIG. 1, the shared physical memory 125 may include memory space allocated to a graphical processing unit portion 126 and a central processing unit portion 127. Although not pictured, in alternate embodiments, the shared physical memory 125 may include memory space allocated to other processing units implemented by the system 100, such as a digital signal processing unit and/or a network processing unit on the system 100, for example.

The system 100 may include a memory partitioning manager execution context 135. The memory partitioning manager execution context 135 may be implemented in a variety of ways. In an embodiment, the memory partitioning manager execution context 135 may be implemented as a virtual machine monitor. As a virtual machine monitor, the memory partitioning manager execution context 135 may coordinate the various virtual machines running on system 100. For example, the memory partitioning manager execution context 135 may coordinate with a virtual machine which changes the operating system running on the system 100. A virtual machine may comprise a software implementation of a computing device that executes programs like a physical computing device. For example, a virtual machine may support the execution of an operating system. In an alternate embodiment, the memory partitioning manager execution context 135 may be implemented to run on the central processing unit 110 as a software component. In another alternate embodiment, the memory partitioning manager execution context 135 may be implemented to run on an operating system, a driver or a microcontroller such as a power control unit or a manageability engine. In yet another embodiment, the memory partitioning manager execution context 135 may run as a hardware unit with a register interface exposed to software control. The embodiments are not limited in this respect.

The memory partitioning manager execution context 135 may include a memory partitioning manager 137. The memory partitioning manager 137 may be responsible for repartitioning the physical memory so that more or less shared physical memory 125 is allocated to the processing units during runtime. The memory partitioning manager 137 may initiate actions to change memory allocation of the physical memory during runtime based on detected needs of the system. The memory partitioning manager 137 may respond to requests from system entities 130, such as but not limited to, applications or operating systems, to alter the allocation of the shared physical memory 125 during runtime. Alternatively or additionally, the memory partitioning manager 137 may respond to requests from a processing unit 110, 120 to obtain more memory during runtime. The memory partitioning manager may run on one of a central processing unit, a graphics driver, a logic circuit, or an operating system.

The system 100 may include one or more system entities 130 which run on a processing unit and use the memory space of the shared physical memory 125 allocated to the processing unit. A system entity 130 may include, but is not limited to, an application, a driver and/or an operating system. For example, the system entity 130 may be an application used to create or update multimedia, such as three dimensional games and/or videos. The application may include a task or function, such as, but not limited to, a two dimensional texture application, a three dimensional texture application, a sound effect application and a shading application. Alternatively, the system entity 130 may include an operating system such as Unix® or Windows®.

The system 100 may include a graphics driver 140. In operation, a system entity 130 may call the graphics driver 140 to present frame(s) 155 of video content. The graphics driver 140 may handle the presenting of a frame 155 to a display 160. The system 100 may also be communicatively coupled with the digital display 160.

Figure 2:
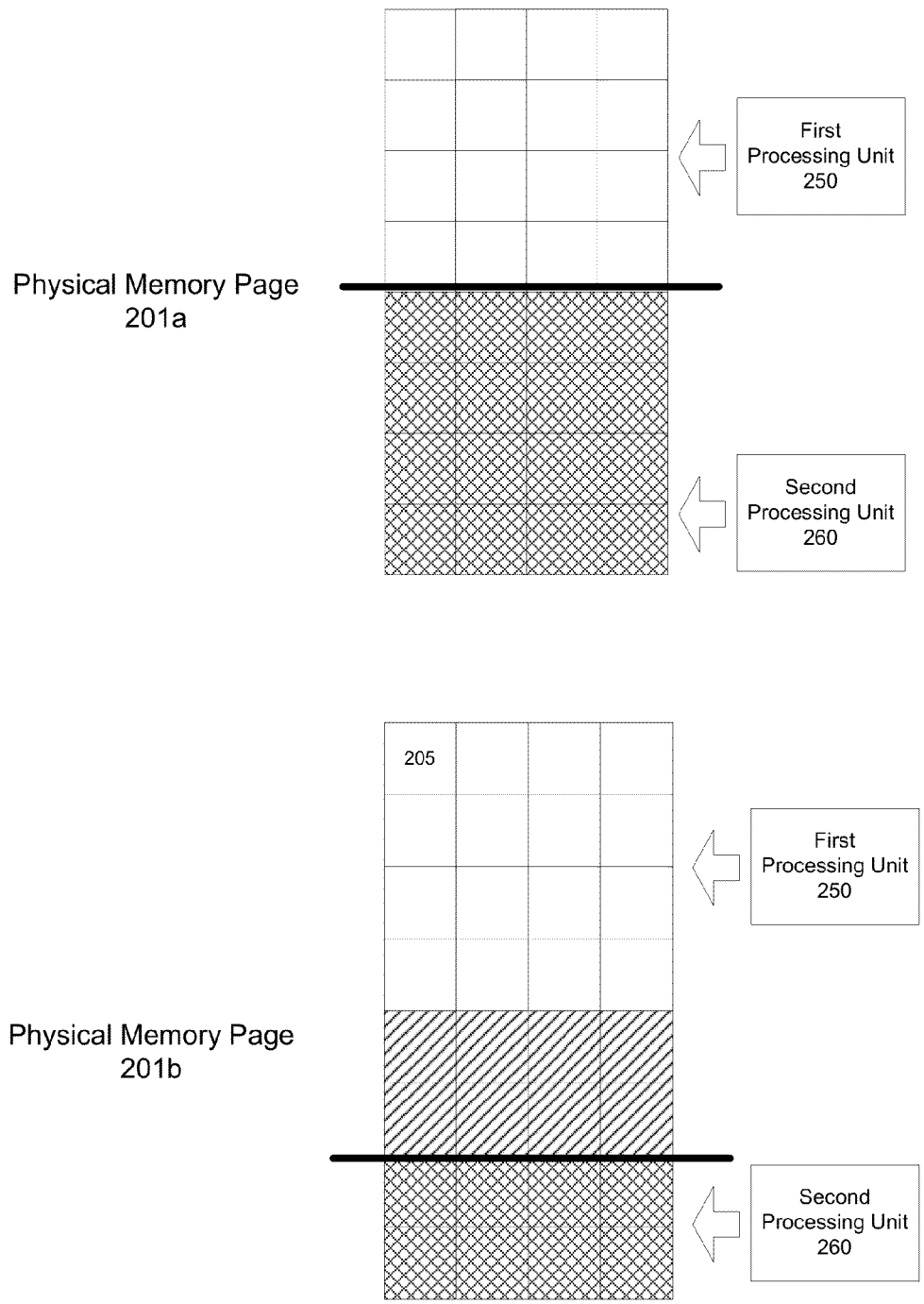
FIG. 2 illustrates one embodiment of reallocating the shared physical memory.

FIG. 2 illustrates an embodiment of dynamically repartitioning the shared physical memory. FIG. 2 illustrates an initial partitioning of shared physical memory 201*a* and a later partitioning of the shared physical memory 201*b*. The shared physical memories 201*a* and 201*b* are depicted as sets of blocks and a block represents a physical memory page. In the initial partitioning of shared physical memory 201*a*, the static memory allocated to a first processing unit 250 may be shown above the static memory allocated to a second processing unit 260. The static memory allocated to the first processing unit 250 may be contiguous to the static memory allocated to the second processing unit 260. For example, the first processing unit 250 may include memory space from 0 to 500 megabytes. The second processing unit 260 may include memory space from 500 to 1000 megabytes. In an embodiment, the first processing unit 250 may represent the central processing unit 120 while the second processing unit 260 may represent the graphical processing unit 110. In an alternate embodiment, the first memory space may represent the graphical processing unit 110 while the second memory space may represent the central processing unit 120. In yet another embodiment, the first memory space may represent a network processing unit while the second memory space may represent a central processing unit 120. In another embodiment there may be a third or more memory spaces allocated to other processing units.

The shared physical memory 201*a* may be repartitioned. When the first processing unit 250 needs more memory, the shared physical memory 201*a* may be repartitioned as shown in 201*b*. Shared physical memory 201*b* is a separate state from shared physical memory 201*a* and the system can be either the state shown in shared physical memory 201*a* or the state shown in shared physical memory 201*b*. As shown in the shared physical memory 201*b*, the first processing unit 250 or a system entity running on the first processing unit 250 may request more memory space. The memory partitioning manager 137 may request an amount of static memory space currently allocated to the second processing unit 260 be reallocated to the first processing unit 250.

Currently, the static memory space may not be reallocated during runtime. Without the use of a memory partitioning manager 137, the reallocation of the static memory may not be possible without causing system failure. The memory partitioning manager 137 may communicate with the first processing unit 250 and the second processing unit 260. This communication may ensure that system entities 130 currently running on the second processing unit 260 are completed so that the requested amount of static memory space currently allocated to the second processing unit 260 may be reallocated to the first processing unit 250 without causing a system failure.

The shared memory allocation 201*b* depicts the new desired partitioning of the memory space allocated to the first processing unit 250 and the second processing unit 260. The memory space allocated from the second processing unit 260 to the first processing unit 250 is contiguous memory space. For example, 128 MB of first memory space may be requested to be reallocated from the second processing unit 260 to the first processing unit 250. The 128 MB of memory space of the second processing unit 110 is the 128 MB of memory space contiguous to the memory space of the first processing unit 120.

Figure 3:
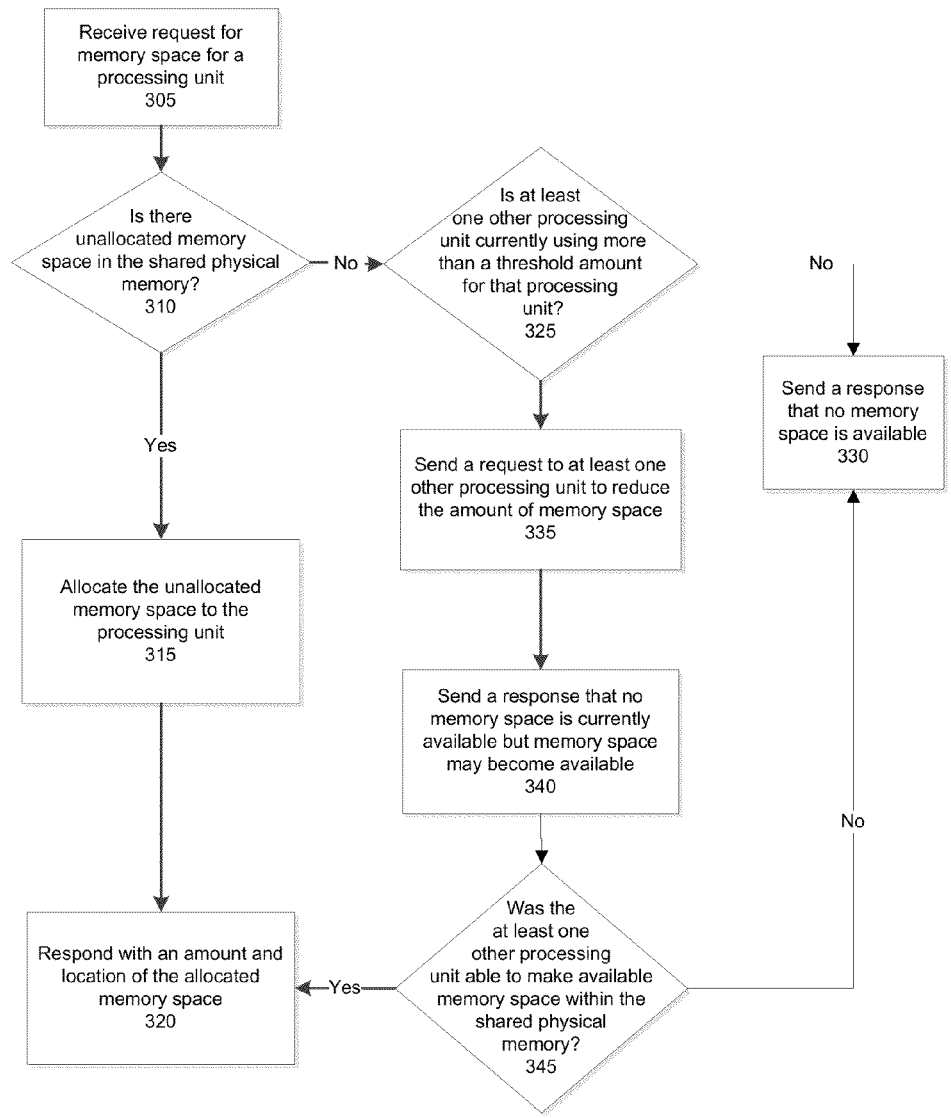
FIG. 3 illustrates one embodiment of a first logic flow.

FIG. 3 illustrates one embodiment of a logic flow 300 of the memory partitioning manager 137 receiving a request for more memory. Included herein are one or more flow charts representative of exemplary methodologies for performing novel aspects of the disclosed architecture. While, for purposes of simplicity of explanation, the one or more methodologies are shown herein in the form of a flow chart or flow diagram and are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The logic flow 300 may receive a request for memory space for a processing unit at block 305. The memory partitioning manager execution context 135 may receive a request to repartition the shared physical memory. The request may be sent from a system entity 130, such as, but not limited to, an operating system, a driver or an application. The system entity 130 may run using a processing unit 110, 120. The system entity 130 may use memory space of the shared physical memory 125 which is allocated to the processing unit 110, 120. However, the memory space in the shared physical memory 125 allocated to the processing unit 110, 120 may be full. In order for the system entity 130 to run on the processing unit 110, 120, the system entity 130 may request more memory space be allocated to the processing unit 110.

For example, a three dimensional application may detect that more physical memory is needed in order for a graphical processing unit 110 to run the three dimensional application and contain or hold textures for a three dimensional image. The graphics driver 140 may initiate a repartitioning request. The graphics driver 140 may be notified of how much physical memory is currently allocated to the graphical processing unit 110. The graphics driver 140 may be notified from either the operating system, the graphical processing unit 110 or the memory partitioning manager 137. As the three dimensional application may create or destroy resources and may perform operations that consume memory allocated to the graphical processing unit 110, the graphics driver 110 may track how much memory is being used on the graphical processing unit 110 by these operations. When the amount of memory needed by the three dimensional application created resources and operations on the graphical processing unit 110 exceeds the amount of physical memory currently allocated to the graphical processing unit 110, the graphics driver 140 may signal the memory partitioning manager 137 to request additional physical memory. Similarly, when the amount of memory needed drops below a currently allocated physical memory threshold amount for the graphical processing unit 110, the graphics driver 140 can notify the memory partitioning manager 137 that the graphical processing unit 110 can use less physical memory.

When the driver determines the graphics processing unit portion 126 of the shared physical memory 125 is full, the current command buffer may be flushed to the graphics processing unit 110 for execution. The graphical processing unit 110 may successfully execute the command buffer prior to the three dimensional application sending a request to the memory partitioning manager 137 for more memory.

In an alternate embodiment, instead of an application requesting more memory, an operating system may request more memory. The operating system may monitor an application's demands on physical memory and the operating system may request that the memory partitioning manager 137 repartition the physical memory based on an application's needs.

In yet another alternate embodiment, a user may request reallocation of the shared physical memory 125. A system 100 may support a manual configuration mode during runtime whereby a user specifies the preferred partitioning of the shared physical memory 125 for the system 100. The user may specify the shared physical memory 125 allocation via an interface such as, but not limited to, a control panel, a keyboard, a joystick and/or a touch screen. Once specified, the memory partitioning manager 137 may receive a request to reallocate the shared physical memory to adhere to the user's request. As a result, users may run applications that fall completely outside of existing application profiles without requiring the system to reinitialize.

For example, a user may prefer the use of the graphical processing unit 120 over the central processing unit 110. The user may use an input device to provide the preferred memory allocation to the memory partitioning manager 137. The user may provide the preferred memory allocation at any time, e.g., at both system initialization or during runtime. Therefore, when the graphical processing unit 120 needs more memory, the memory partitioning manager 137 may send a request to the central processing unit 110 to make available memory space to reallocate to the graphical processing unit.

In another alternative embodiment, the request to reallocate the shared physical memory 125 may be based on an application specific profile. Anytime during the running of the system 100, an application may be loaded as a system entity 130 and the application may include an application specific profile. The application specific profile may request a change to the distribution of the physical memory during runtime. The memory partitioning manager 137 may receive the request from the application specific profile to reallocate the memory space in the shared physical memory 125.

The logic flow 300 may determine whether there is unallocated memory space in the shared physical memory 125 at block 310. The memory partitioning manager 137 may receive the request. The memory partitioning manager 137 may determine whether there is available memory space to allocate to the processing unit 110, 120. The memory partitioning manager may determine whether more memory space is available by identifying any unallocated memory space in the shared physical memory 125.

When the memory partitioning manager 137 determines that there is unallocated memory, the logic flow 300 may allocate the unallocated memory to the processing unit 110, 120 at block 315. The memory partitioning manager 137 may allocate the available unallocated memory space to the processing unit 110, 120 by reprogramming hardware registers associated with the processing unit 110, 120. For example, a processing unit 110, 120 may maintain a pair of memory address range registers that define a set of available, addressable physical memory. The processing unit 110, 120 may have a first register for a starting address and a second register for an ending address. When physical memory partitioning changes, the memory partitioning manager 137 may write new values to these registers for each affected processing unit 110, 120.

In one embodiment, after the new values are written, the processing unit 110, 120 may receive an interrupt notification of a change to these registers that is handled by a software component running on the processing unit 110, 120. The software component may update its locally maintained information about the valid addressable memory space. In an alternate embodiment, after the new values are written, the memory partitioning manager 137 may update the registers and notify the software components on the affected processing units 110, 120 via a software message. In yet another alternative embodiment, the software component may be responsible for maintaining the available memory space and may poll the hardware registers periodically to determine if the allocation of the memory space has changed.

The logic flow 300 may respond with an amount and location of the allocated memory space at block 320. The memory partitioning manager 137 may send a response to the requestor with the amount of the memory space to be allocated to the processing unit 110, 120. In an embodiment, the memory partitioning manager 137 may send an asynchronous response to the requestor. As the memory partitioning manager 137 determined that the shared physical memory included unallocated memory space, the memory partitioning manager 127 may allocate all or some portion of the unallocated memory space to the processing unit 110, 120. For example, the memory partitioning manager 137 may allocate the minimum amount of memory space needed by the processing unit 110, 120 to run a system entity. The amount allocated by the memory partitioning manager 137 may be equal to the amount requested by a user and/or sufficient to run the system entity.

Alternatively, the amount allocated by the memory partitioning manager 137 may be less than the requested amount and/or an insufficient amount to run the system entity. The memory partitioning manager 137 may request memory from other processing units. For example, the memory partitioning manager 137 may determine that there is no unallocated physical memory space. As more memory is needed, the logic flow 300 may send a request to at least one other processing unit to use less memory at block 335. In an embodiment, the memory partitioning manager 137 may send an asynchronous request.

In an optional embodiment, the logic flow 300 may determine whether at least one other processing unit is currently using more than a threshold amount for that processing unit at block 325. The memory partitioning manager 137 may determine whether another processing unit is using and/or allocated more than a threshold or minimum amount for that processing unit. For example, the memory partitioning manager 137 may assign a threshold amount of memory space of the shared physical memory allocated to a processing unit. Alternatively, the threshold amount may be assigned by a user of the system 100. In yet another alternative example, the threshold amount may be assigned by an operating system or an application specific profile. Based on the threshold amount, the memory partitioning manger 137 may determine that a processing unit, such as the graphical processing memory 110, is currently allocated more memory space than a threshold amount. As a result, the memory partitioning manager 137 may request that the graphical processing memory 110 use less memory. The memory partition manager may request that the graphical processing unit 110 reduce the allocated memory space by a certain amount. The embodiments are not limited to the example above.

The logic flow 300 may send a response that no memory space is available at block 330. For example, a system entity 130 may have sent a request for more memory space. The memory partitioning manager 137 may determine at block 310 that there is no unallocated memory space or not a sufficient amount of unallocated memory space. The memory partitioning manager 137 may determine at block 325 that no processing unit is currently using more than a threshold amount. As a result, the memory partitioning manager 137 may respond to the request that no memory space is available to allocate to the processing unit.

The logic flow 300 may send an asynchronous request to at least one other processing unit to reduce the amount of memory space at block 335. The memory partitioning manager 137 may send an asynchronous request to at least one other processing unit to use less memory space based on the determination that all the shared physical memory 125 has been allocated at block 310. Optionally, the memory partitioning manager 137 may send an asynchronous request to a processing unit to use less memory space based on the determination that the processing unit is using more than a threshold amount.

The logic flow 300 may send a response that no memory space is currently available but memory space may become available at block 340. The memory partitioning manager 137 may make a callback to the requestor when it determines whether memory space can be allocated to the processing unit 110, 120. For example, the memory partitioning manager 137 may send a response to a system entity 135 that initiated the request for more memory space for the processing unit. The memory partitioning manager 137 may respond that no memory space is currently available but that the memory partitioning manager 137 will asynchronously send a message to the system entity 130 if and/or when memory space becomes available.

The logic flow 300 may determine whether at least one other processing unit was able to make available memory space within the shared physical memory at block 345. If another processing unit was able to make available memory space within the shared physical memory 125, then the logic flow 300 may respond with an amount of the allocated memory space at block 320. The response may inform the requestor that the memory partitioning manger 137 may allocate the available memory space to the processing unit 110, 120. As a result of the newly allocated memory, the system entity 130 may run on the processing unit 110, 120.

Alternatively, if no processing unit 110, 120 made available memory space in the shared physical memory, the logic flow 300 may respond that no memory space is available at block 330. For example, no processing unit 110, 120 may be using more than its minimum amount threshold. In this case, the system may be running optimally with all memory completely utilized, despite the fact that one or more processing units could benefit from more memory.

Figure 4:
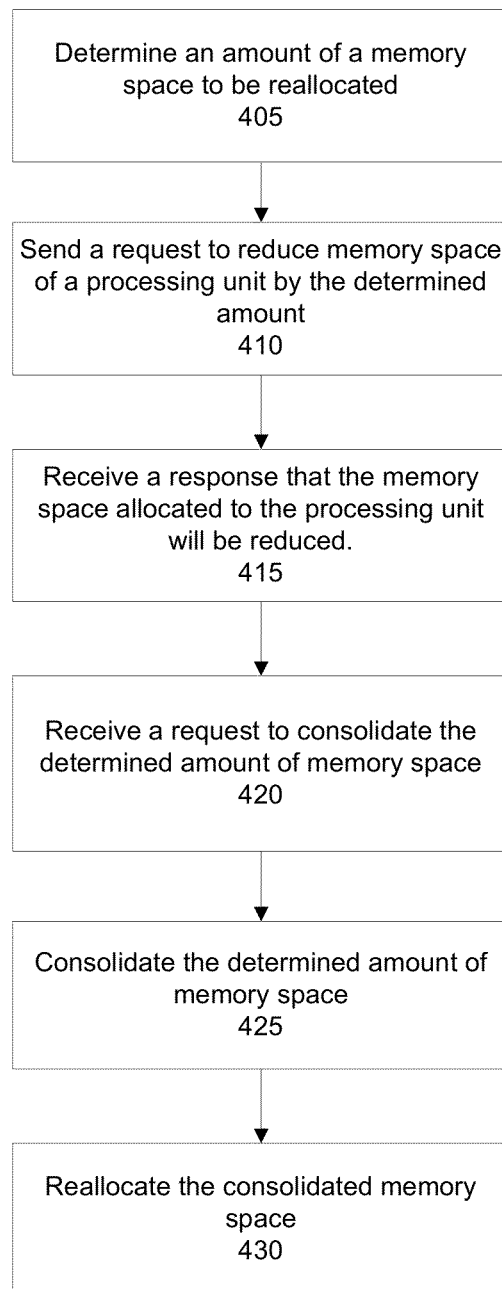
FIG. 4 illustrates one embodiment of a second logic flow.

FIG. 4 illustrates one embodiment of a logic flow 400 in which the amount of memory allocated to a processing unit 110, 120 is reduced according to embodiments of the invention. The logic flow 400 depicts a processing unit making available memory space. The logic flow 400 may be representative of some or all of the operations executed by one or more embodiments described herein.

In the illustrated embodiment shown in FIG. 4, the logic flow 400 may determine an amount of memory space to be reallocated at block 405. The memory partitioning manager 137 may determine the amount of memory space based on a request received from a processing unit. The memory partitioning manager 137 may identify when and which processing unit should reduce a determined amount of allocated memory. For example, the memory partitioning manager 137 may identify when a processing unit is allocated more than a minimum threshold amount of the shared physical memory 125. In another example, the memory partitioning manager 137 may receive a request for more memory space and determine that the amount of memory space allocated to a particular processing unit should be decreased based on an application profile or user request.

The logic flow 400 may send a request to reduce memory space utilized by a processing unit at block 410. The memory partitioning manager 137 may send the request to a processing unit. Alternatively, the memory partitioning manager 137 may send the request to an entity managing a processing unit. For example, if the memory partitioning manager 137 requests that the graphical processing unit 110 reduce its allocated memory space in the shared physical memory 125, then the memory partitioning manager 137 may send the request to a graphics driver or an operating system managing the graphical processing unit 110. Alternatively, if the memory partitioning manager 137 requests that the central processing unit 120 reduce its allocated memory space in the shared physical memory 125, then the memory partitioning manager 137 may send the request to an operating system managing the central processing unit 125.

The request sent from the memory partitioning manager 137 may include an amount by which to reduce the memory space allocated to a processing unit. In an embodiment, the memory partitioning manager 137 may request that the processing unit 110, 120 reduce its utilization of the memory space by an entire amount needed by a system entity in FIG. 3. In another embodiment, the memory partitioning manager 137 may request less than the full amount of memory space requested in FIG. 3. For example, the memory partitioning manager 137 may allocate some memory space from unallocated memory space. Alternatively, the memory partitioning manager 137 may allocate memory space from another processing unit.

The logic flow 400 may receive a response that the memory space allocated to the processing unit 110, 120 will be reduced at block 415. The memory partitioning manager 137 may receive a response that the entity managing the processing unit 110, 120 will asynchronously reduce the amount of memory space allocated to the processing unit in the shared physical memory 125. The entity managing the processing unit 110, 120 may asynchronously reduce the memory space by a determined amount within the processing unit's allocated portion 126, 127 of the shared physical memory 125.

Figure 5:
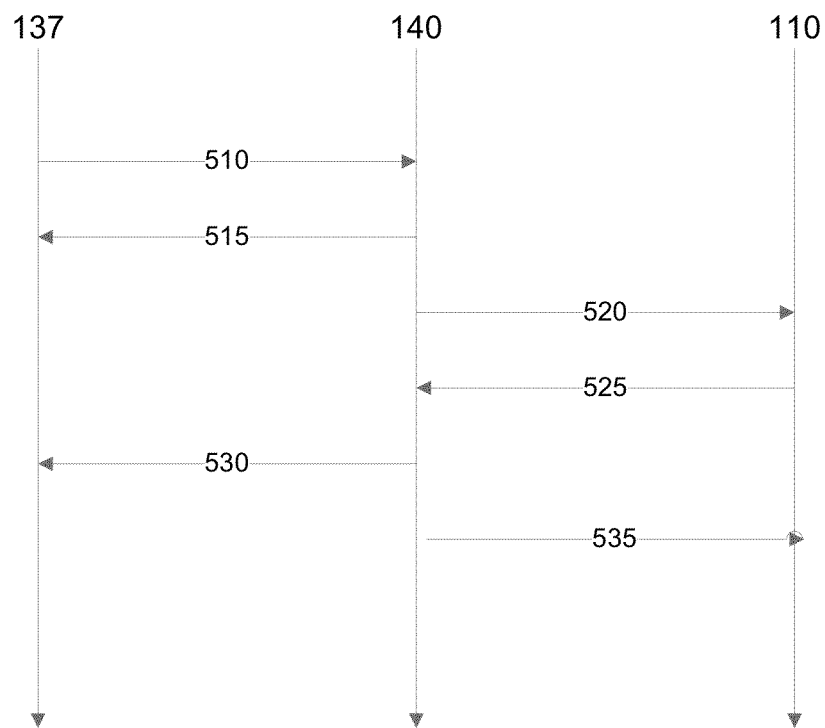
FIG. 5 illustrates one embodiment of a communication within the system.

If there is insufficient available memory space within the processing unit's portion of the physical memory, memory space may be made available as further discussed in FIG. 5. Once there is available memory space within the processing unit's portion of the shared physical memory 126, 127, the processing unit 110, 120 may send a request to the memory partitioning manager 137 to consolidate the shared physical memory 125.

The logic flow 400 may receive a request to consolidate the determined amount of memory space at block 420. The memory partitioning manager 137 may receive a request to consolidate the memory space after the entity managing the processing unit makes available the requested amount of memory space. The memory partitioning manager 137 may receive a consolidation request to consolidate the available memory space in order to reparation the shared physical memory 125.

The logic flow 400 may consolidate the determined amount of memory space at block 425. The memory partitioning manager 137 may consolidate the determined amount of memory space by copying memory resources in the memory space to be allocated to a second processing unit, into the available memory spaces which will remain allocated to the first processing unit. Memory resources may be information and/or memory arrays within the memory space. The memory space to be allocated to the second processing unit may be the determined amount of memory space allocated to the first processing unit requested by the memory partitioning manager. The memory resources within the determined amount of the memory space may be copied into the available memory space which will remain allocated to the first processing unit. This rearranging may place the available memory spaces in the determined amount of memory space to be allocated to the second processing unit. The memory resources in the determined amount of memory space may be copied to memory space that will remain allocated to the first processing unit.

For example, at system initialization, megabytes 0 to 100 may be allocated to a first processing unit and megabytes 100 to 200 may be allocated to a second processing unit. The memory partitioning manager may send a request to reallocate 20 megabytes of the first processing unit's memory space to the second processing unit. The first processing unit may make available memory within the first processing unit's portion of the shared physical memory 125. The memory spaces made available by the entity managing the first processing unit may be located throughout the memory space allocated to the processing unit. For example, the 20 available megabytes of memory space made available may be located throughout the 0 to 100 megabytes of memory. However, in order to reallocate 20 megabytes of memory space from the first processing unit to the second processing unit, the memory space in the first processing unit needs to be contiguous with the memory space in the second processing unit. Accordingly, megabytes 80-100 are contiguous in order to allocate the 20 megabytes from the first processing unit to the second processing unit. The memory partitioning manager 137 may consolidate memory space allocated to the first processing unit by copying memory resources in megabytes 80-100 into available memory spaces in megabytes 0-80.

In another embodiment, the memory partitioning manager 137 may consolidate the determined amount of memory space by remapping physical pages. In other words, the physical pages in the memory space to be reallocated to another processing unit may be remapped. The remapping of physical pages in virtual memory may preclude the need for copying as processing units often use a virtual address space through a paging structure to map memory addresses used by software, e.g., virtual addresses, into physical addresses used by hardware to locate the actual memory contents. For example, a virtual address of 0x50000 may translate via the page tables into physical memory address 0xfe804200. In the case where a system is virtualized with operating systems running as virtual machines, there is an additional level of translation. The physical address, as viewed by the virtual machine, may not necessary match the actual physical address used by the hardware. An additional layer of translation may be maintained by the virtual memory manager. If the memory partitioning manager 137 is operating within the virtual memory manager or can communicate with the virtual memory manager, then the memory partitioning manager 137 may cause the virtual machines physical memory reference of 0xfe804200 to point to a different physical page then 0xfe804200. Therefore, if a processing unit needed physical address 0xfe804200 in order to have a contiguous memory region, the memory partitioning manger 137, as part of the virtual memory manager, may allow the processing unit to perceive physical address 0xfe804200 as available, when in fact this address was translated into some other available physical page.

The logic flow 400 may reallocate the consolidated memory space at block 430. Once the memory partitioning manager 137 consolidates the memory space, the shared physical memory 125 may be dynamically repartitioned. The memory partitioning manager 137 may dynamically allocate the determined memory space to the other processing unit during runtime. In an embodiment, the hardware range registers may be updated as discussed above. The registers may be used to enforce access protections between processing units. In the virtual memory manager remapping case discussed above, the processing units may have full range access to the entire physical memory space and security controls may be enforced via the virtual memory manager or some other mechanism.

FIG. 5 illustrates one embodiment of the communication between the memory partitioning manager and a processing unit. In FIG. 5, the memory partitioning manager 137 may communicate with a graphics driver 140 in order to reduce the memory allocated to the graphical processing unit 110. The graphics driver 140 may manage a graphical processing unit 110. The embodiments described herein are not limited to this example.

The memory partitioning manager 137 may send a request 510 to the graphics driver 140 to reduce the memory space utilized by the graphical processing unit 110. The graphics driver 140 may receive the request 510 to reduce the memory space allocated to the graphical processing unit 110 in the shared physical memory 125. The request may include an amount by which to reduce the memory space.

The graphics driver 140 may respond to the memory partitioning manager 137 indicating that the memory space allocated to the graphical processing unit 110 will be reduced. The graphics driver 140 may send a request 520 to the graphical processing unit 110 to determine when the graphical processing unit 110 has finished its current task.

The graphical processing unit 110 may wait until the graphical processing unit portion 126 of the shared physical memory 125 that needs to be released is no longer active, e.g., is no longer being used. The graphical processing unit 110 may wait until a task is completed prior to reducing memory space in order to ensure that the system 100 remains synchronized. By ensuring synchronization, the reduction of memory space allocated to a processing unit 110, 120 may be a seamless process. As a result, all tasks may be completed without failure and/or without the system 100 freezing. For example, the graphics driver 140 may wait unit the current frame received by the graphical processing unit 110 has completed rendering all active rendering contexts prior to reducing the graphical processing unit portion 126 of the shared physical memory 125.

Once the graphical processing unit 110 has completed the tasks, the graphics processing unit 110 may send the graphics driver 140 a notification 525 that the current tasks are completed. The graphics driver 140 may make available the requested amount of memory space in the graphical processing unit portion 126 of the shared physical memory 125 currently allocated to the graphical processing unit 110. The memory space may be made available by freeing memory resources, copying memory resources or paging memory resources to a non-volatile long term storage, such as, but not limited to a magnetic or hard disk. Memory resources may be information and/or memory arrays within the memory space. For example, the graphical processing unit 110 may make available memory space by deleting memory resources or memory arrays in the physical memory that are no longer being used and/or are no longer needed. In an alternate example, the graphical processing unit 110 may page the memory resources to a magnetic disk.

Once the memory space is available, the graphics driver 140 may send a request 530 to the memory partitioning manager 137 to consolidate the memory space that was made available by graphics driver 140. The memory partitioning manager may consolidate the memory space thus repartitioning the shared physical memory 125. The memory partitioning manager may consolidate the requested memory space and the requested amount of memory space may be allocated to another processing unit as discussed in FIG. 4.

After the repartitioning, the graphics driver 140 may rearrange 535 any memory resources which were displaced to make available memory space. The graphics driver 140 may manage copying the memory resources into memory space allocated to the graphical processing unit 110 according to existing methods.

Figure 6:
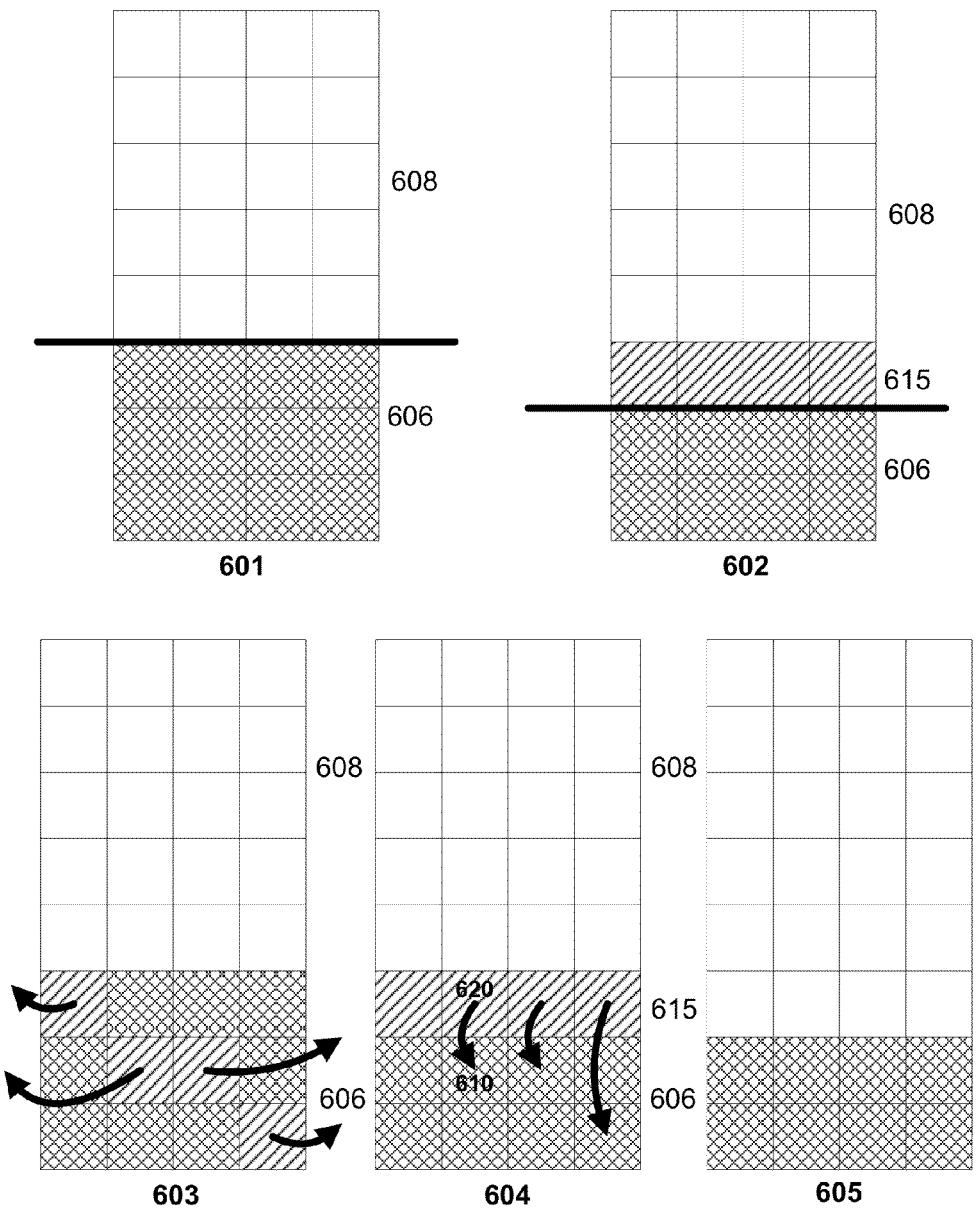
FIG. 6 illustrates another embodiment of reallocating the shared physical memory.

FIG. 6 illustrates an embodiment of dynamically repartitioning the shared physical memory. In the initial partitioning of the shared physical memory in 601, the memory space allocated to a first processing unit may be the first set of kilobytes 606 in the shared physical memory while the memory allocated to the second processing unit may be the second set of kilobytes 608 of the shared physical memory. For example, the first processing unit may be the central processing unit 120 and the second processing unit may be the graphical processing unit 110. The embodiments described herein are not limited to this example.

In the shared physical memory 602, the memory partitioning manager 137 may receive a request for more memory for the central processing unit 120. The memory partitioning manager 137 may determine an amount of memory space to allocate to the graphical processing unit 120. The memory partitioning manager 137 may request an amount of a first memory space 606 currently allocated to the central processing memory unit 606 to be reallocated to the graphical processing unit 110. The shared physical memory 602 depicts the new desired partitioning of the memory space 606 allocated to the central processing unit 120. Graphical processing unit 110 may be allocated the memory space 608 and also newly allocated memory space 615. The shared physical memory 602 illustrates the amount of memory 615 to be repartitioned from the central processing unit portion 127 of the shared physical memory to the graphical processing unit portion 126 of the shared physical memory 125. For example, 128 MB of first memory space 606 may be reallocated from the central processing unit 120 to the graphical processing unit 110.

In the shared physical memory 603, memory resources from the memory space 606 allocated to the central processing unit 120 may be copied to virtual memory in order to reduce the amount of memory space needed by the central processing unit 120. In an embodiment, the memory resources from the memory space 606 allocated to the central processing unit 120 may include memory arrays, memory information and/or memory content. Memory space from the central processing unit portion 127 of the shared physical memory 125 may be made available by an entity managing the central processing unit 120 such as, but not limited to, a graphics driver 140 or a system entity 130 such as an operating system. The entity managing the central processing unit 120 may copy memory resources from the central processing unit portion 127 into paged memory on a non-volatile long term storage, such as, but not limited to, a magnetic or hard disk, until the central processing unit portion 127 has sufficient memory space available to be reallocated to the graphical processing unit 110. In an embodiment, the entity managing the central processing unit 120 may copy memory resources from the central processing unit portion 127 into any type of backup storage device that is accessible to the central processing unit 120. The non-volatile long term storage or backup storage device may be larger but have a slower processing speed than the shared physical memory 125.

As a processing unit uses contiguous memory space, the memory space which is now available within the central processing unit 120 memory space may be made into a memory space 615 contiguous to the memory space allocated to the graphical processing unit 110. In the shared physical memory 604, the memory partitioning manager 137 may copy memory resources from the memory space 615 to be allocated to the graphical processing unit 110 to the available memory space 606 which will remain allocated to the central processing unit 120. For example, the memory resources from memory page 620 of the memory space 615 to be reallocated to the graphical processing unit 110 may be copied into the available memory page 610 in the memory space 606 which will remain allocated to the central processing unit 120. By copying the memory resources from memory page 620 into available memory page 610 which will remain allocated to the central processing unit 120, the memory space 615 contiguous to the graphical processing unit portion 126 may become available. Once the memory space 615 is available memory space, it may be repartitioned to be part of the graphical processing unit portion 126.

In the shared physical memory 605, the memory space 615 requested for the graphical processing unit 110 may be dynamically reallocated to the graphical processing unit 110 during runtime. The memory partitioning manager 137 may dynamically allocate the memory space 615 to the graphical processing unit 110 during runtime. The graphical processing unit 110 and/or the entity managing the graphical processing unit 110 may control the graphical processing unit portion 126 of the shared physical memory, including the requested memory space 615.

After the memory space 615 is dynamically reallocated to the graphical processing unit 110 during runtime, any memory resources of the central processing unit 120 that were stored in the paged memory on a storage device such as, but not limited to, non-volatile long term memory or a magnetic disk, may be transferred back to the central processing unit portion 127 of the shared physical memory 125. In an embodiment, the memory resources may be transferred back into a different part or region of the memory space of the central processing unit portion 127 than where the memory resources were originally located. The entity managing the central processing unit 120 may copy the memory resources into various memory pages in the memory space 606 allocated to the central processing unit 120 via on-demand paging as per current methods. In an embodiment, a system entity, such as the operating system, may manage the memory space according to current methods. Current methods may include, but are not limited to, copying memory resources into physical memory for disk on demand at the time a program requests the resources.

Figure 7:
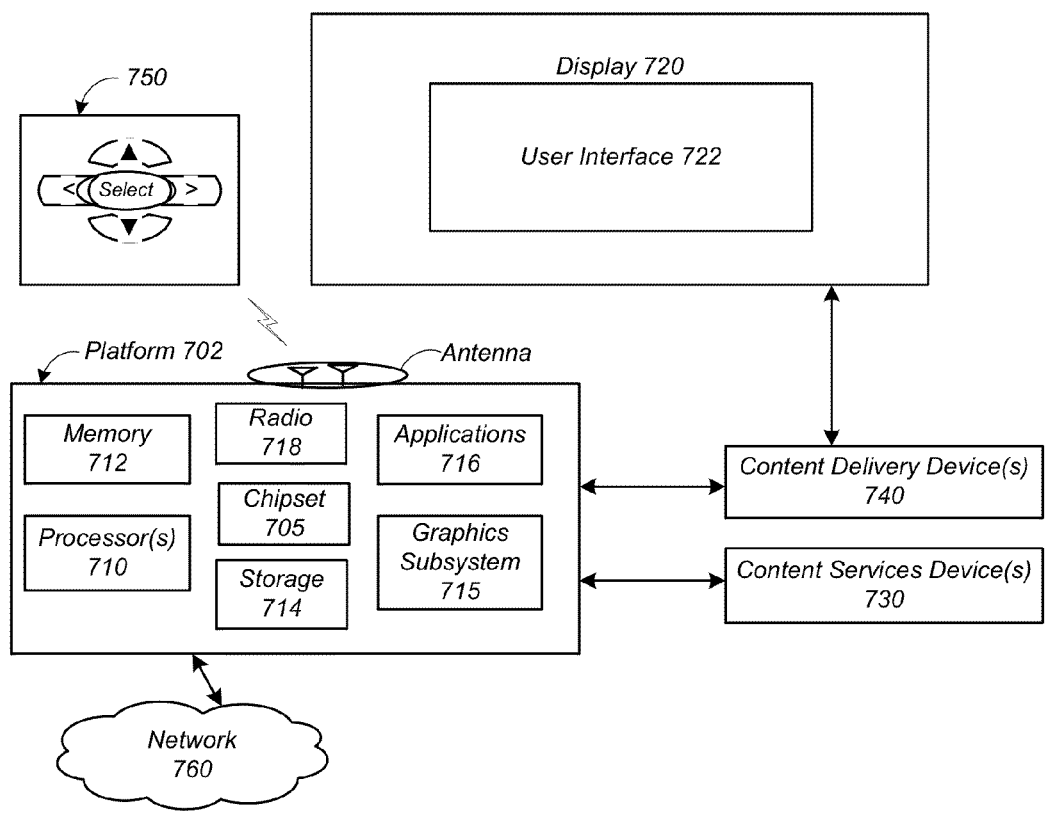
FIG. 7 illustrates an embodiment of a second system.

FIG. 7 illustrates an embodiment of a system 700 that may be suitable for implementing the system of FIG. 1 of the disclosure. In embodiments, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application programming interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor(s) 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor(s) 710 may be implemented as Complex Instruction Set Computer (CISC) or Reduced Instruction Set Computer (RISC) processors, x86 instruction set compatible processors, multi-core, or any other microprocessor or central processing unit. In embodiments, processor(s) 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphical processing unit (GPU) 110 or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. For example, the radio may include a radio receiver. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after system initialization, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 6.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
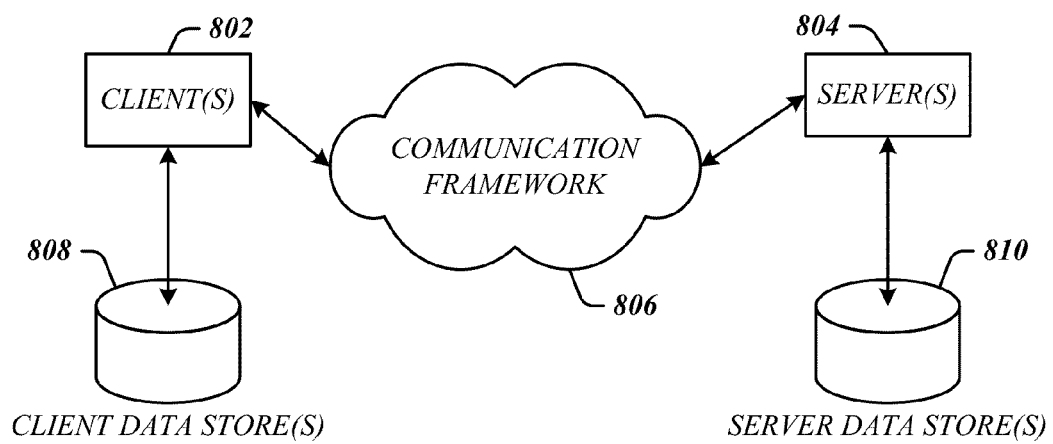
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application programming interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

In some embodiments, a computer-implemented method may include determining an amount of a memory space in a physical memory allocated to a first processing unit during system initialization, consolidating the determined amount of the memory space, and reallocating the consolidated memory space to the second processing unit during runtime. A request to allocate memory space to a second processing unit may be received. It may be determined whether the physical memory includes unallocated memory space. It may be determined whether the first processing unit includes available memory space. It may be determined whether the memory space allocated to the first processing unit exceeds a threshold. Physical pages from the determined amount of the memory space may be remapped. Memory resources may be copied into a non-volatile long term storage to make available memory space within the first processing unit. Memory resources within the determined amount of the memory space may be copied into available memory space allocated to the first processing unit. A request to reallocate the physical memory during runtime may be received based on a user created profile for allocation of the physical memory, an application specific profile or on dynamic determinations by a system entity. In an embodiment, the system entity may be an operating system.

In an embodiment, an apparatus may include a plurality of processing units and a memory partitioning manager operative on the at least one of the plurality of processing units to repartition a physical memory comprising a first memory space allocated to a first processing unit and a second memory space allocated to a second processing unit. The memory partitioning manager may be operative to determine an amount of the first memory space to be reallocated to the second processing unit and reallocate the determined amount of the first memory space to the second processing unit during runtime. The memory partitioning manager may be operative to consolidate the determined amount of first memory space. The memory partitioning manager may be operative to receive a request to allocate memory space to the second processing unit. The memory partitioning manager may be operative to determine whether the first processing unit includes available memory space. The memory partitioning manager may run on a virtual machine monitor. The memory partitioning manager may run on one of: a central processing unit, a graphics driver, a logic circuit, or an operating system. The memory partitioning manager may be operative to determine whether the first memory space allocated to the first processing unit exceeds a threshold. The memory partitioning manager may be operative to remap physical pages from the determined amount of the memory space. The apparatus may include a digital display operatively coupled to at least one of the plurality of processing units.

In various embodiments at least one machine readable medium may include a plurality of instructions that in response to being executed on a computing device cause the computing device to request an amount of a memory space in a physical memory allocated to a first processing unit to be reallocated to a second processing unit, consolidate the requested amount of the memory space in the physical memory allocated to the first processing unit during runtime, and reallocate the consolidated memory space to the second processing unit. The at least one machine readable medium may include a plurality of instructions that in response to being executed on a computing device cause the computing device to determine whether the physical memory includes unallocated memory space. The at least one machine readable medium may include a plurality of instructions that in response to being executed on a computing device cause the computing device to determine whether the memory space allocated to the first processing unit exceeds a threshold. The at least one machine readable medium may include a plurality of instructions that in response to being executed on a computing device cause the computing device to remap physical pages from the requested amount of the memory space. The at least one machine readable medium may include a plurality of instructions that in response to being executed on a computing device cause the computing device to copy memory resources into a non-volatile long term memory to make available memory space within the first processing unit.

In some embodiments, a system may include plurality of processing units, a digital display operatively coupled to at least one of the plurality of processing units and a memory partitioning manager on at least one of the plurality of processing units to reallocate a first memory space in a physical memory space allocated to a first processing unit and a second memory space in the physical memory space allocated to a second processing unit. The memory partitioning manager may be operative to determine an amount of the first memory space to allocate to the second processing unit, consolidate the determined amount of first memory space and reallocate the consolidated first memory space to the second processing unit. The system may include a radio receiver operatively coupled to at least one of the plurality of processing units. The memory partitioning manager may be operative to copy memory resources into a non-volatile long term memory to make available memory space within the first processing unit. The memory partitioning manager may be operative to copy memory resources within the determined amount of the first memory space into available memory space allocated to the first processing unit. The system may include a third memory space in the physical memory space and the memory partitioning manager operative to determine an amount of the third memory space to allocate to a third processing unit, consolidate the determined amount of third memory space and reallocate the consolidated third memory space to the third processing unit.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
    determining an amount of a memory space in a physical memory allocated to a central processing unit (CPU) during system initialization, the physical memory electrically accessible to the CPU;
    determining whether a system entity is currently being executed by the CPU within the determined amount of memory space;
    consolidating the determined amount of the memory space in response to a determination that the system entity is not currently being executed within the determined amount of memory space; and
    reallocating the consolidated memory space to an integrated graphics processing unit (GPU) of the CPU during runtime, the physical memory electrically accessible to the integrated GPU.

2. The computer-implemented method of claim 1, comprising:
    receiving at the CPU a request to allocate memory space to the integrated GPU.

3. The computer-implemented method of claim 1, comprising:
    determining whether the physical memory includes unallocated memory space.

4. The computer-implemented method of claim 1, comprising:
    determining whether the memory space allocated to the CPU includes available memory space.

5. The computer-implemented method of claim 1, comprising:
    determining whether the memory space allocated to the CPU exceeds a threshold.

6. The computer-implemented method of claim 1, comprising:
    remapping physical pages from the determined amount of the memory space.

7. The computer-implemented method of claim 1, comprising:
    copying memory resources into a non-volatile long term storage to make available memory space within the CPU.

8. The computer-implemented method of claim 1, comprising:
    copying memory resources within the determined amount of the memory space into available memory space allocated to the CPU.

9. The computer-implemented method of claim 1, comprising:
    receiving a request to reallocate the physical memory to the integrated GPU during runtime based on a user created profile for allocation of the physical memory.

10. The computer-implemented method of claim 1, comprising:
    receiving a request to reallocate the physical memory to the integrated GPU during runtime based on an application specific profile.

11. The computer-implemented method of claim 1, comprising:

receiving a request to reallocate the physical memory to the integrated GPU during runtime based on dynamic determinations by a system entity.

12. An apparatus comprising:
a plurality of processing units including a central processing unit (CPU) and an integrated graphics processing unit (GPU) of the CPU; and
a memory partitioning manager operative on at least one processing unit of the plurality of processing units to repartition a physical memory comprising a first memory space allocated to the CPU and a second memory space allocated to the integrated GPU, the physical memory electrically accessible to the CPU and the integrated GPU, the memory partitioning manager operative to:
determine an amount of the first memory space to be reallocated from the CPU to the integrated GPU;
determine whether a system entity is currently being executed by the CPU within the determined amount of the first memory space; and
reallocate the determined amount of the first memory space from the CPU to the integrated GPU during runtime in response to a determination that the system entity is not currently being executed within the determined amount of the first memory space.

13. The apparatus of claim 12, the memory partitioning manager operative to consolidate the determined amount of first memory space.

14. The apparatus of claim 12, the memory partitioning manager operative to receive a request to allocate memory space to the integrated GPU.

15. The apparatus of claim 12, the memory partitioning manager operative to determine whether the first memory space includes available memory space.

16. The apparatus of claim 12, the memory partitioning manager runs on a virtual machine monitor.

17. The apparatus of claim 12, the memory partitioning manager runs on one of: a central processing unit, a graphics driver, a logic circuit, or an operating system.

18. The apparatus of claim 12, the memory partitioning manager operative to determine whether the first memory space allocated to the CPU exceeds a threshold.

19. The apparatus claim 12, the memory partitioning manager operative to remap physical pages from the determined amount of the memory space.

20. The apparatus of claim 12, comprising:
a digital display operatively coupled to at least one processing unit of the plurality of processing units.

21. At least one non-transitory machine readable storage medium comprising a plurality of instructions that in response to being executed on a computing device cause the computing device to:
request an amount of a memory space in a physical memory allocated to a central processing unit (CPU) to be reallocated to an integrated graphics (GPU) of the CPU, the physical memory electrically accessible to the CPU and the integrated GPU;
determine whether a system entity is currently being executed by the CPU within the requested amount of memory space;
consolidate the requested amount of the memory space in the physical memory allocated to the CPU during runtime in response to a determination that the system entity is not currently being executed within the requested amount of memory space; and
reallocate the consolidated memory space to the integrated GPU.

22. The at least one non-transitory machine readable storage medium of claim 21, comprising a plurality of instructions that in response to being executed on the computing device cause the computing device to determine whether the physical memory includes unallocated memory space.

23. The at least one non-transitory machine readable storage medium of claim 21, comprising a plurality of instructions that in response to being executed on the computing device cause the computing device to determine whether the physical memory allocated to the CPU exceeds a threshold.

24. The at least one non-transitory machine readable storage medium of claim 21, comprising a plurality of instructions that in response to being executed on the computing device cause the computing device to remap physical pages from the requested amount of the memory space.

25. The at least one non-transitory machine readable storage medium of claim 21, comprising a plurality of instructions that in response to being executed on the computing device cause the computing device to copy memory resources into a non-volatile long term memory to make available memory space within the physical memory allocated to the CPU.

26. A system comprising:
a plurality of processing units including a central processing unit (CPU) and an integrated graphics processing unit (GPU) of the CPU;
a digital display operatively coupled to at least one of the plurality of processing units; and
a memory partitioning manager operative on at least one processing unit of the plurality of processing units to reallocate a first memory space in a physical memory space allocated to the CPU and a second memory space in the physical memory space allocated to the integrated GPU, the physical memory electrically accessible to the CPU and the integrated GPU, the memory partitioning manager operative to:
determine an amount of the first memory space to reallocate to the integrated GPU;
determine whether a system entity is currently being executed by the CPU within the determined amount of the first memory space;
consolidate the determined amount of the first memory space in response to a determination that the system entity is not currently being executed within the determined amount of the first memory space; and
reallocate the consolidated first memory space to the integrated GPU during runtime.

27. The system of claim 26, comprising:
a radio receiver operatively coupled to at least one processing unit of the plurality of processing units.

28. The system of claim 26, the memory partitioning manager operative to copy memory resources within the determined amount of the first memory space into available memory space allocated to the CPU.

29. The system of claim 26, comprising:
a third memory space in the physical memory space; and
the memory partitioning manager operative to:
determine an amount of the third memory space to allocate to one of the plurality of processing units;
consolidate the determined amount of third memory space; and
reallocate the consolidated third memory space to the one of the plurality of processing units.

* * * * *